United States Patent
Saito et al.

[11] Patent Number: 5,918,006
[45] Date of Patent: *Jun. 29, 1999

[54] COMMUNICATION DEVICE PROVIDED WITH A STORAGE MEDIUM FOR STORING A CONTROL PROGRAM

[75] Inventors: Hitoshi Saito, Yokohama; Toru Maeda, Mitaka; Takaaki Hashimoto, Hiratsuka; Masanori Momose, Tokyo; Naoki Sugawara, Yokohama; Shinichiro Kohri, Kawasaki; Makoto Kobayashi, Kawasaki; Masashi Kimura, Kawasaki; Koichiro Ohtsuka, Kawasaki; Seiji Ohmori, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,122

[22] Filed: Dec. 15, 1995

[30] Foreign Application Priority Data

Dec. 20, 1994 [JP] Japan .................................. 6-334788
Apr. 18, 1995 [JP] Japan .................................. 7-092384
Dec. 8, 1995 [JP] Japan .................................. 7-320411

[51] Int. Cl.$^6$ ..................................................... G06F 11/00
[52] U.S. Cl. ............................... 395/185.07; 395/185.1
[58] Field of Search ........................ 395/185.01, 185.07, 395/185.1, 185.02; 371/21.5, 67.1; 364/265.1

[56] References Cited

U.S. PATENT DOCUMENTS

| | | | |
|---|---|---|---|
| 4,179,733 | 12/1979 | Launzel et al. | 395/188.01 |
| 4,266,272 | 5/1981 | Berglund et al. | 395/482 |
| 5,146,459 | 9/1992 | Shimizu | 395/185.07 |
| 5,252,812 | 10/1993 | Nakamura | 235/380 |
| 5,282,242 | 1/1994 | Hachinoda | 379/100 |
| 5,309,434 | 5/1994 | Maekawa | 370/62 |
| 5,315,403 | 5/1994 | Hirai et al. | 358/404 |
| 5,328,278 | 7/1994 | Kokubo | 400/74 |
| 5,428,768 | 6/1995 | Sugahara | 395/182.08 |
| 5,493,649 | 2/1996 | Slivka et al. | 395/185.01 |
| 5,507,031 | 4/1996 | Nakamura | 395/800 |
| 5,539,877 | 7/1996 | Winokur et al. | 395/183.02 |

Primary Examiner—Robert W. Beausoliel, Jr.
Assistant Examiner—Scott T. Baderman
Attorney, Agent, or Firm—Fitzpatrick, Cella, Harper & Scinto

[57] ABSTRACT

A communication device includes a storage medium for storing a program and information used to detect any error in the program, to prevent the communication device from further abnormal operation when an error occurs in the stored program. The occurrence of an error in the program is detected by performing a calculation based on the stored program, and comparing the result of the calculation with the above-described information stored in the storage medium. A predetermined operation is further performed depending on the result of the comparison.

105 Claims, 12 Drawing Sheets

FIG. 6

'95 05/01 MON 16:01 FAX 03 3455 9000  ○○○COMPANY                                P001

```
************************************
*      LIST OF CLEARED DATA        *
************************************

THE DATA LISTED BELOW HAVE BEEN CLEARED
```

| SERIAL NUMBER | COMMUNICATION MODE | DESTINATION | NUMBER OF PAGES | TIME OF ACCEPTING | STARTING TIME | SENDER |
|---|---|---|---|---|---|---|
| 0010 | RECEIVED IN MEMORY | 045 123 4567 | 2 | 05/01 12:20 | | |
| 0011 | RECEIVED IN MEMORY | 03 987 6543 | 10 | 05/01 12:32 | | |
| 0012 | RECEIVED IN MEMORY | 03 321 6754 | 3 | 05/01 13:05 | | | ns
COMMUNICATION DEVICE PROVIDED WITH A STORAGE MEDIUM FOR STORING A CONTROL PROGRAM

BACKGROUND OF THE INVENTION

1. Field of the Invention

The present invention relates to a communication device having a control program stored in a storage medium.

2. Description of the Related Art

In common communication devices, a control program is stored in a storage medium such as a read only memory (ROM).

The ROM also stores a checksum used to detect an error in a program. The checksum refers to the sum of all the program data stored in the ROM, and it has a valid value when there is no error in the stored program. Before installing a ROM in a communication device, all program data stored in the ROM is read, and the sum of the data is calculated. The resultant sum is compared with the checksum. If the resultant sum is valid, it is concluded that the program is correctly stored in the ROM, and the ROM is installed in the communication device.

With this technique, although it is possible to detect an error in a ROM when the ROM is installed in a communication device, it nonetheless becomes impossible to read the program if the stored program is destroyed or a failure occurs in a circuit for reading the program after the communication device has been shipped.

In the case where the operation of the communication device stops due to such an error or failure, a user can easily know that the communication device has suffered a failure. However, in practice, some errors or failures result in abnormal operation only when a particular operation is requested, and thus the communication device may operate correctly almost always unless that particular operation is performed. In such a case, it is difficult to know the cause of the problem. Moreover, in some cases, the error or failure ultimately results in trouble fatal to the device.

SUMMARY OF THE INVENTION

It is an object of the present invention to provide a technique for preventing a communication device from abnormal operation when a program stored in a storage medium installed in the communication device is destroyed.

It is another object of the present invention to provide a technique to prevent a communication device from abnormal operation when a circuit for reading a program is destroyed.

It is still another object of the present invention to provide a technique to notify a user that the communication device has image data stored therein if such data exists when a circuit for reading a program or the program itself is destroyed.

It is a further object of the present invention to provide a technique of notifying a user of an error or failure when a circuit for reading a program or the program itself is destroyed.

Other objects and aspects of the invention will become more apparent from the following description of the preferred embodiments with reference to the accompanying drawings.

BRIEF DESCRIPTION OF THE DRAWINGS

FIG. 6 illustrates an example of a report output according to the second embodiment of the invention;

FIG. 14 is a flowchart illustrating a checksum task according to a fifth embodiment of the invention.

DESCRIPTION OF THE PREFERRED EMBODIMENTS

With reference to the accompanying drawings, a first embodiment of the invention is described in detail below.

Figure 1:
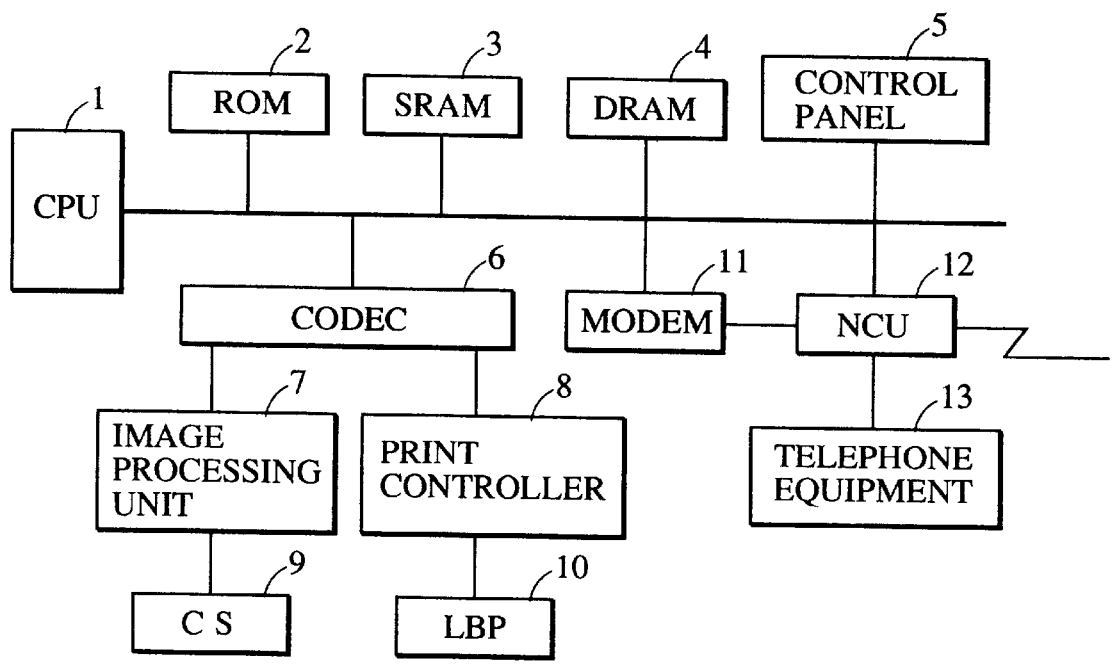
FIG. 1 is a block diagram illustrating the construction of a facsimile device according to a first embodiment of the invention.

FIG. 1 is a block diagram illustrating the construction of a facsimile device according to a first embodiment of the invention.

As shown in FIG. 1, the facsimile device includes: a CPU 1 responsible for controlling the entire device; a ROM 2 for storing a program; a static RAM ("SRAM") 3 for storing image management data or registration data; a DRAM 4 for storing image information; a control panel 5 via which an operation command is given; a CODEC (coder/decoder) 6 for coding and decoding image information; an image processing unit 7 for processing given image information; a print controller 8 for controlling the operation of smoothing the data to be printed and the operation of an LBP (laser beam printer) 10 for printing the data; a CS (contact type sensor) 9 for reading a document; a modem 11 for performing modulation and demodulation between an analog signal and digital signal; an NCU (network control unit) 12 for controlling the connection to a public telephone network (not shown); and a telephone device 13 for speech communication.

Figure 3:
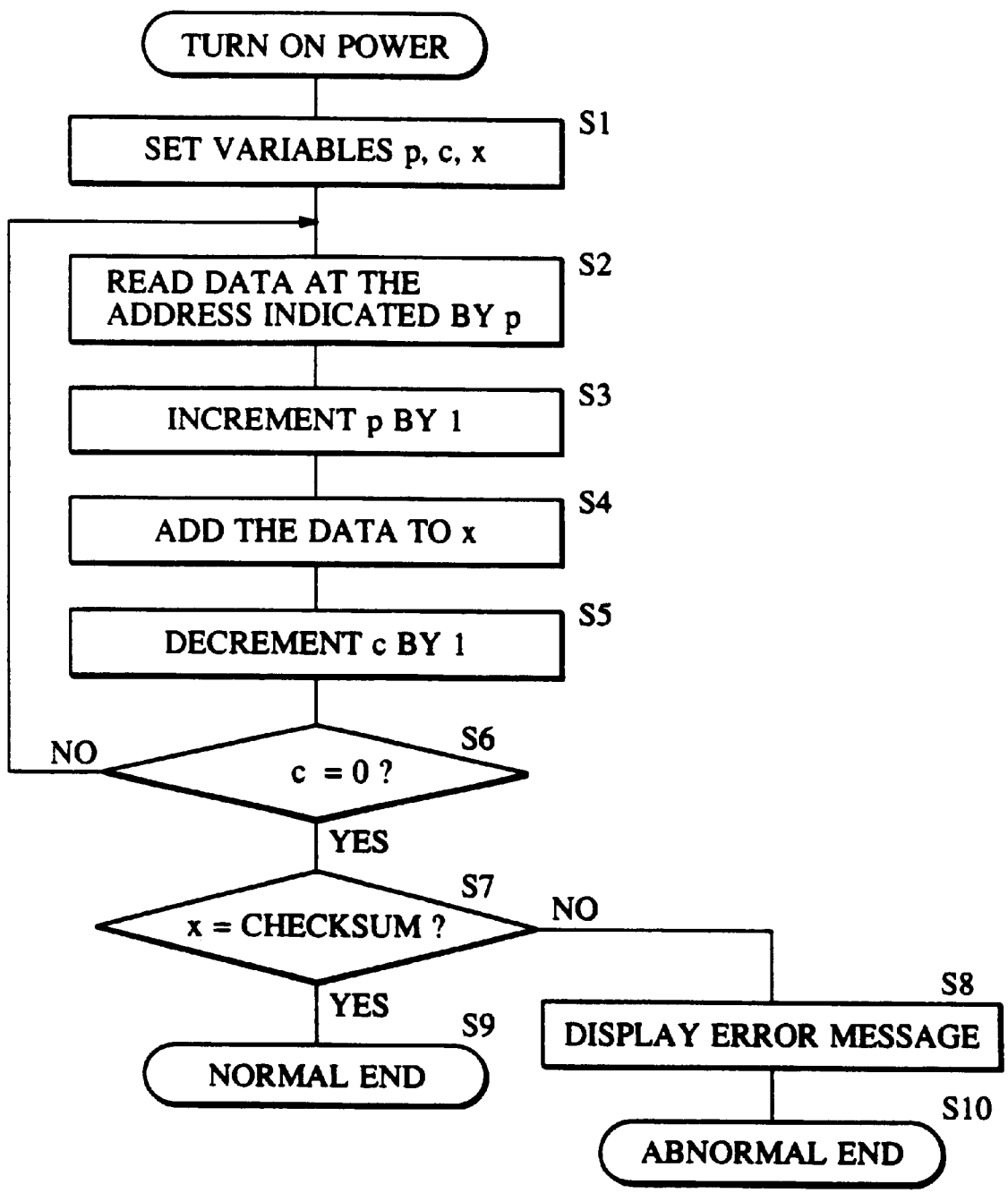
FIG. 3 is a flowchart of the operation of the facsimile device according to the first embodiment of the invention.

FIG. 3 is a flow chart of the operation of the facsimile device according to the first embodiment of the invention.

Figure 2:
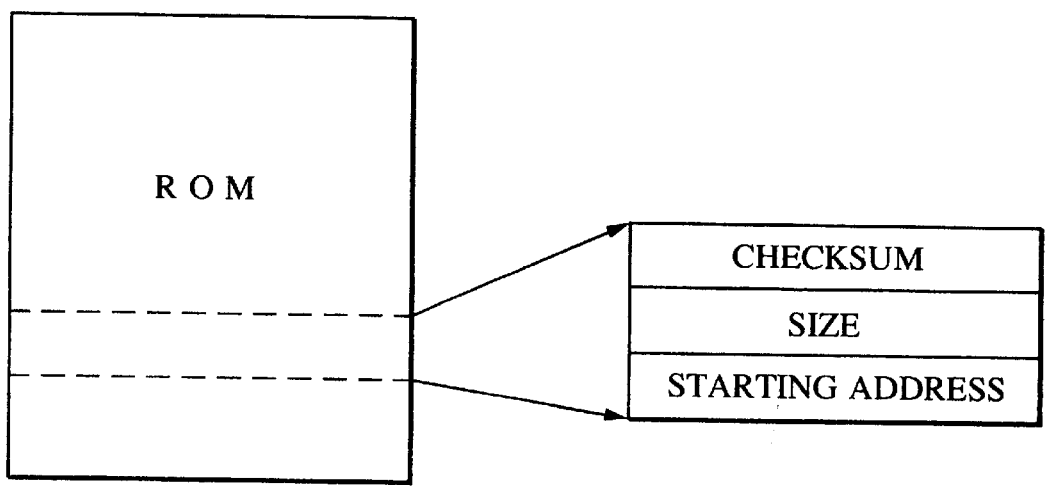
FIG. 2 is a schematic representation of the contents stored in a ROM according to the first embodiment of the invention.

When the power of the facsimile device is turned on, the CPU 1 reads all data stored in the ROM 2 and calculates the checksum. As shown in FIG. 2, the ROM 2 stores the information regarding the starting address of the stored data, the size of the ROM 2, and the checksum which has been calculated in advance.

In the first step S1 after the power has been turned on, the CPU 1 reads the starting address and the size of the ROM and writes these values as variables p and c, respectively, into the SRAM 3. The CPU 1 also initializes the variable x to 0.

In step S2, the CPU 1 reads one byte of data at the address pointed to by the variable p. In step S3, the CPU 1 increments the variable p by 1, and then in step S4 adds the obtained data to the variable x.

In step S5, c is decremented by 1. Then in step S6, it is checked whether c is equal to 0. If c is not equal to 0, the process returns to step S2 and the above-described steps are performed repeatedly until c becomes equal to 0.

If it is concluded in step S6 that c is equal to 0, the process goes to step S7 to check whether x is equal to the checksum value which has been stored in advance in the ROM. If yes, it can be concluded that the contents of the ROM have been read correctly, and thus the process goes to step S9 at which the ROM test routine is completed successfully. Thus, the facsimile device is now ready for accepting an operation command entered by a user.

In the case where it is concluded in step S7 that x is not equal to the checksum, the process goes to step S8 so as to display an error message. Then the process is terminated in an abnormal state at step S10. After that, no operation command from the user is accepted.

The abnormal termination at step S10 may be performed by entering an endless loop in which the error message is displayed so that any commands entered by the user via a key operation and incoming calls from an exchange are ignored. Alternatively, the power may be forcibly turned off. In the latter case, the power may be turned off after a watch dog timer has detected the passage of a predetermined time.

Thus, in this embodiment of the invention, if the data is not read correctly from the ROM, the facsimile device is protected from further abnormal operation.

Now, a second embodiment of the invention will be described below.

When the checksum is examined according to the technique of the first embodiment described above, if an error is detected in the checksum and thus the operation is stopped, the second embodiment offers the further capability of displaying the list of image data stored in the facsimile device, if such data exist, thereby informing a user that those data will be lost due to the abnormal termination of operation.

The facsimile device of this embodiment has the same overall construction as the first embodiment (refer to FIG. 1).

In this embodiment, image data is managed as described in detail below.

The image data is stored in the DRAM 4. To deal with the image data, management information is required about various matters such as the destination, the acceptance time, the number of pages, the resolution and size of each page, and the availability of memory space in the DRAM.

In this embodiment, the image data is managed according to these items of management information stored in the SRAM 3.

Figure 4:
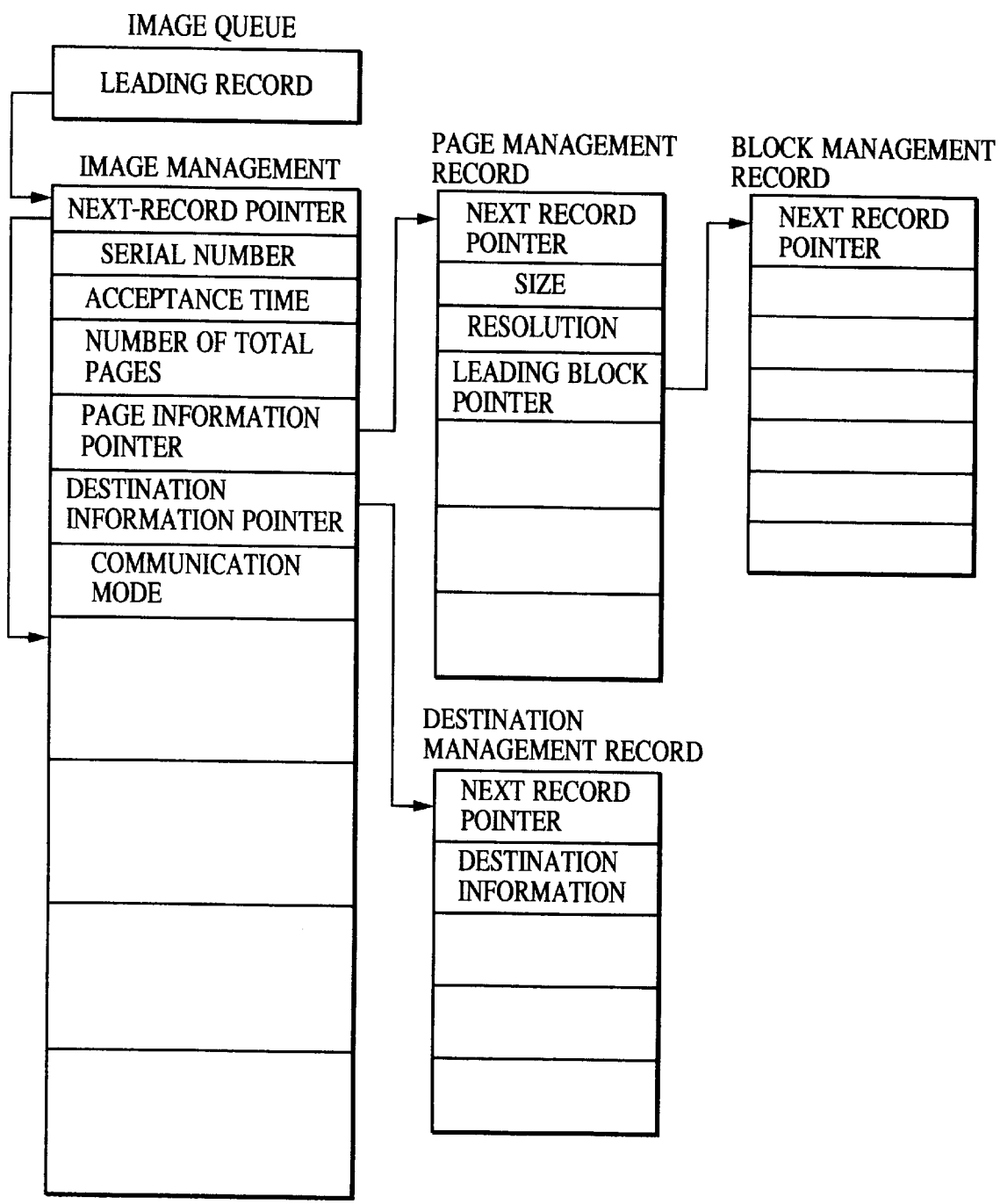
FIG. 4 is a schematic representation of an example of management information of image data stored in a RAM, according to a second embodiment of the invention.

The image data management information is organized as shown in FIG. 4. An image management record contains management information about each image. The image management record consists of an array of structures wherein each record consists of fields associating with a serial number, acceptance time, the total number of pages, a page information pointer, a destination information pointer, a communication mode, and a next-record pointer.

The image management record consists of a plurality of structures depending on the capacity in the DRAM 4.

Furthermore, there is provided an image queue outside the image management record so that image data having a particular attribute may be retrieved from the image management record.

If there is image data in the image queue, the queue contains a pointer which points to a first record so that the management record of a particular body of image data can be obtained according to the pointer.

If there is no image data, "0" is written in the image queue, wherein the "0" indicates the absence of image data. If there are a plurality of images, the field "next record" of the first image serves as a pointer which points to the next record so that the next image can be accessed according to this pointer. The "next record" pointer of the management record of the last image contains "0" so as to indicate no further image exists.

In this embodiment, the image queue is used to retrieve image data which has been received and stored in memory. If the image queue contains some data other than "0", then there is some image data in the memory. If there are images in the queue, the management record of the first image can be obtained by accessing the record pointed to by the first pointer in the image queue. Furthermore, the management record of the next image can be accessed according to the "next record" pointer. Thus, it is possible to obtain the management information of all image data stored in the memory by accessing all management records one by one.

Figure 5:
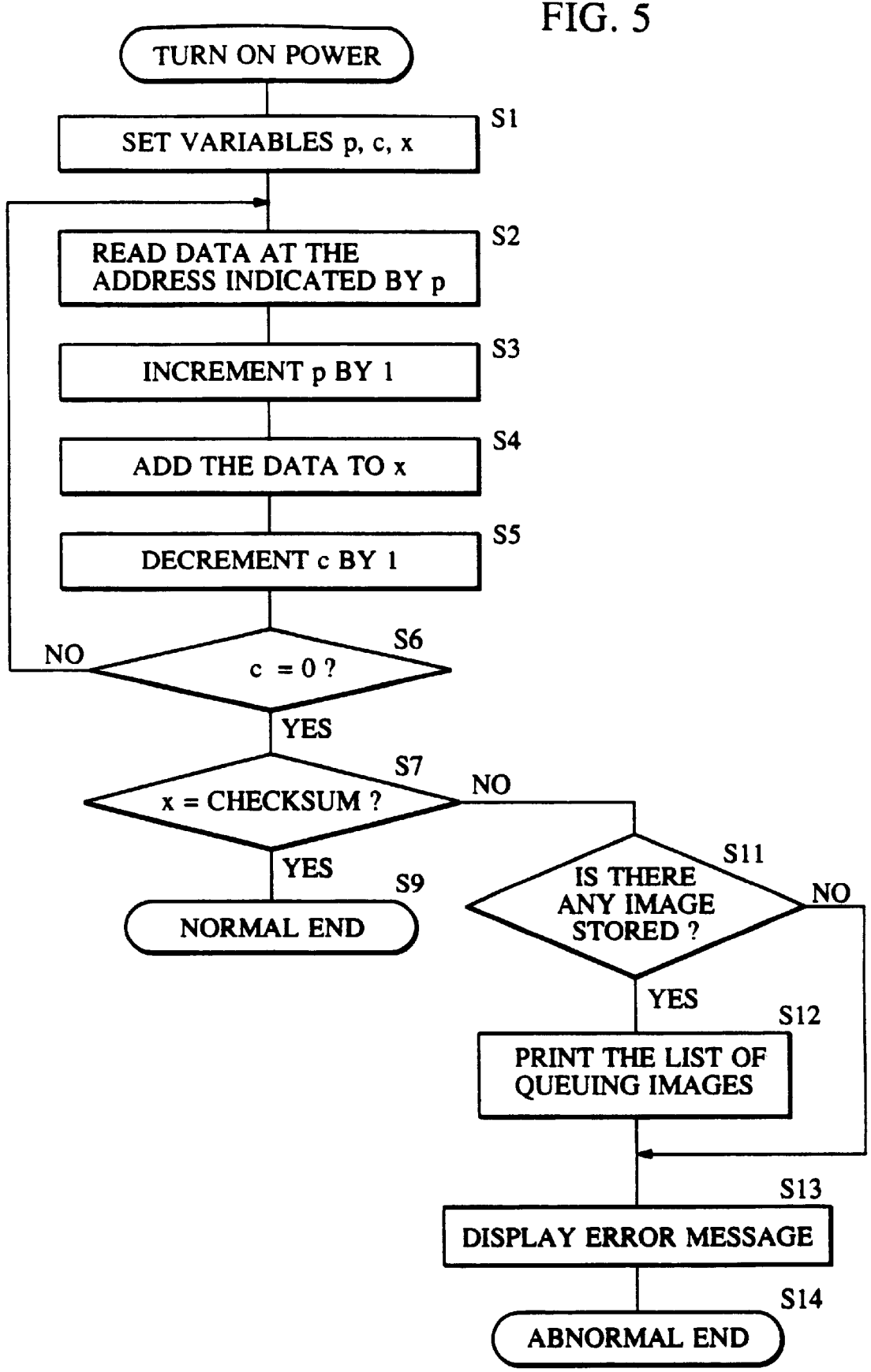
FIG. 5 is a flowchart illustrating the operation of a facsimile device according to the second embodiment of the invention.

With reference to the flow chart shown in FIG. 5, the operation of the facsimile device of the second embodiment will be descried below.

In this second embodiment, the test of the checksum associated with the ROM is performed in the same manner as in the first embodiment. That is, the ROM 2 stores the information, at a predetermined address, about the starting address of the stored data, the size of the ROM 2, and a reference checksum value which has been calculated in advance so that a checksum value can be calculated and compared with the reference value stored therein. According to the information stored in the ROM 2, the CPU reads all data from the ROM and calculates the sum of that data, thereby obtaining a checksum value. The resultant checksum value is compared with the reference checksum value stored in the ROM 2. (The above process is performed in steps S1 to S7.)

If the two values are equal to each other, the test of the checksum has been completed successfully (in step S9), and thus the facsimile device becomes ready for starting its usual operation in response to a command entered by a user via a key operation or in response to a calling signal received via an exchange as in the first embodiment.

If it is concluded in step S7 that the calculated checksum is invalid, the process goes to step S11 so as to examine the management information stored in the SRAM 3, thereby checking whether there is any image data stored in the facsimile device, unlike the first embodiment in which the process is stopped immediately if the calculated checksum is invalid. More specifically, the image queue of image data stored in the memory is examined, and if it turns out that "0" is stored there, it is concluded that there is no image data. In this case, the process goes to step S13, and an error message is displayed. Then in step S14, the process is terminated in an abnormal state.

On the other hand, if there is stored image data, the process goes to step S12 and prints a list of the image data according to the image management information stored in the SRAM 3.

The list is produced on the basis of information obtained by retrieving the management information of the image data stored in the memory starting from the first record pointed to by the image queue, and thus reading the serial number, accepting time, the number of the total pages, and the communication mode.

In this embodiment, this list is referred to as a "list of cleared data", and one example is shown in FIG. 6.

After the completion of printing the list, the process goes to step S13 to display an error message.

After that, the process is terminated at step S14 in an abnormal state.

The abnormal termination at step S14 may be performed by entering an endless loop or forcibly turning off the power, as in the first embodiment.

Thus, in this embodiment, the user can obtain a list about image data which has been lost. In this embodiment as described above, it is assumed that the image data is stored in the DRAM and the management information of image data is stored in the SRAM. Alternatively, both may be stored in an SRAM or a battery-backed DRAM.

Now, a third embodiment will be described below.

When a checksum error is detected and a list is printed, if the error occurs in a memory area in which the printing program is stored, trouble can occur in the operation of printing the list. The third embodiment offers a technique of avoiding such a problem.

For this purpose, the ROM stores the checksum values for individual functions as well as the checksum value for the entire program. Before printing the list, it is checked whether the checksum associated with the printing program is valid. Only when the checksum is valid is the printing performed, and thus the printing operation is not performed if the checksum associated with the printing program is invalid.

Figure 7:
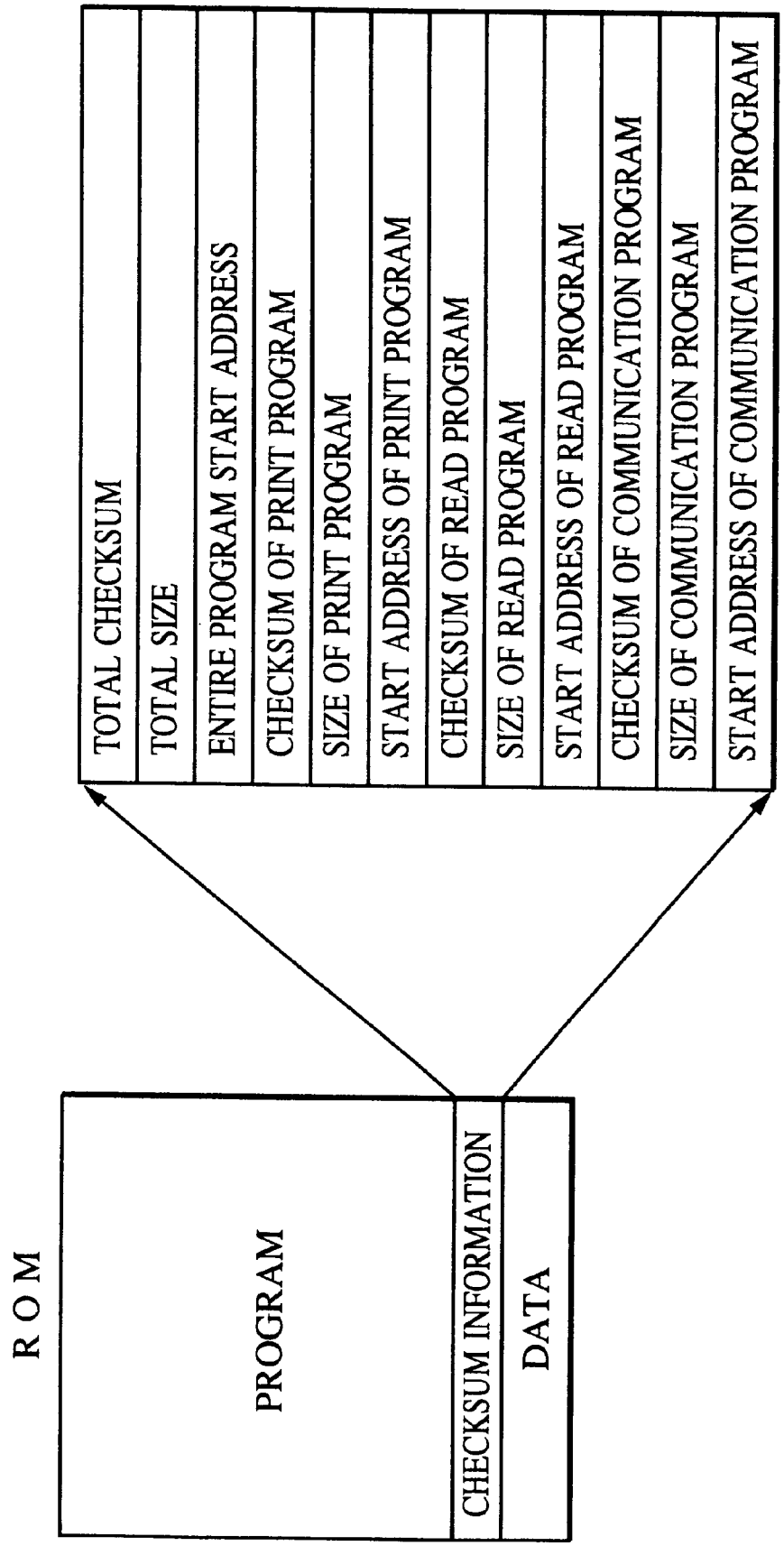
FIG. 7 illustrates an example of information stored in a ROM according to a third embodiment of the invention.

In this embodiment, as shown in FIG. 7, the ROM stores the checksum information of the entire program, printing program, reading program, and communication program. Each set of checksum information contains the starting address pointer, the size information, and the reference checksum value which has been calculated in advance for each corresponding program, so that the checksum may be evaluated in a similar manner to the first and second embodiments.

Figure 8:
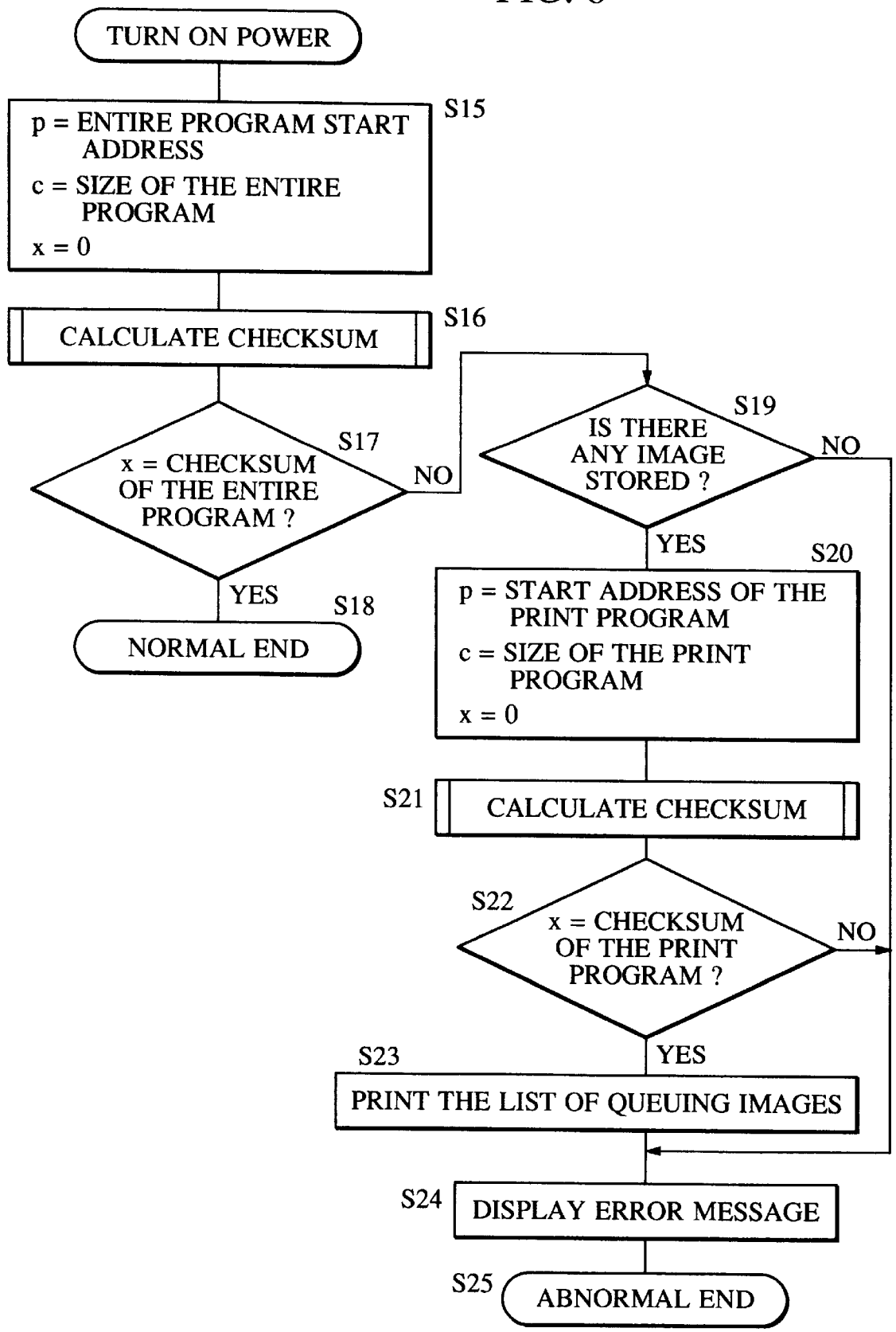
FIG. 8 is a flowchart illustrating the operation of a facsimile device according to the third embodiment of the invention.

With reference to the flowchart shown in FIG. 8, a third embodiment of the invention will described below.

In this embodiment, the checksum is calculated at different steps in the process. That is, the checksum is calculated in step S16 and in step S21 of the process shown in FIG. 8 by calling a subroutine shown in FIG. 9.

The facsimile device of this embodiment has the same construction as the first and second embodiments. In this embodiment, image data is managed in the same manner as in the second embodiment. Therefore, the construction and the data management are not described in further detail here.

At the first step S15 after the power of the facsimile device is turned on, variables p, c, and x are initialized. Here, p represents the starting address of the entire program, c represents the total size of the ROM, and x is equal to 0.

Then in step S15, the checksum is calculated according to the values of p, c, and x given in step S16.

Figure 9:
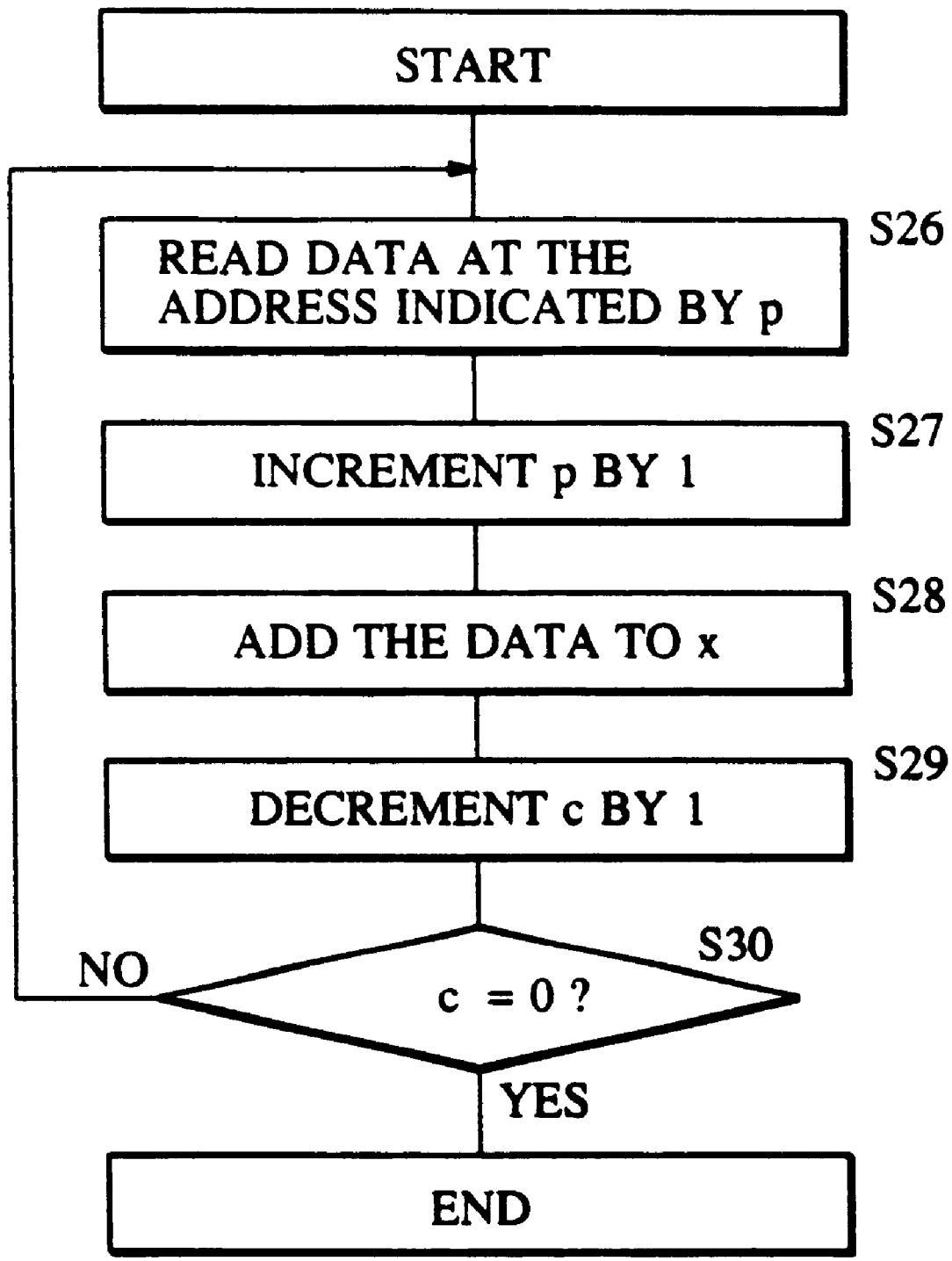
FIG. 9 is a flowchart illustrating the process of calculating a checksum according to the third embodiment of the invention.

The calculation of the checksum is performed in the manner shown in the flowchart of FIG. 9. That is, in step S26, one byte of data is read from the ROM at the address pointed to by p. In step S27, p is incremented by 1. Then in step S28, the data obtained in step S26 is added to x. In step S29, c is decremented by 1. In step S30, it is checked whether c is equal to 0. If no, then the process returns to step S26, and the above-described steps are performed repeatedly until c becomes 0. Once c becomes 0, the resultant value of x gives the checksum and thus the calculation of the checksum is completed.

After the completion of calculating the checksum, the value of x obtained in steps S16 is compared with the reference value of the checksum associated with the entire program. If the calculated checksum is valid, the test of the checksum has been completed successfully at step S18. Thus the facsimile device becomes ready for starting its usual operation in response to a command entered by a user via a key operation or in response to a calling signal received via an exchange.

In the case where it is concluded in step S17 that the checksum is invalid, the process goes to step S19, and the management information is retrieved from the SRAM 3. Then it is checked whether there is any image data stored in the memory, on the basis of the retrieved management information. If it is concluded that there is no image data stored, the process goes to step S24, in which an error message is displayed as in the first and second embodiments. Then in step S25, the process is terminated in an abnormal state.

On the other hand, if it is concluded in step S19 that there is image data stored, the process goes to step S20 to start checking whether the printing program is error-free. That is, variables p, c, and x are set so that p represents the starting address of the printing program, c represents the size of the printing program, and x is equal to 0. Then in step S21 the checksum calculation subroutine is called as in step S16.

In step S22, it is checked whether the obtained value of x is equal to the reference value of the checksum associated with the printing program. If the value of x is not valid, it is concluded that the printing program has been damaged, and thus the process jumps to step S24, skipping the operation of printing a list. In step S24, an error message is displayed, and then in step S25 the process stops in an abnormal state.

On the other hand, if it is concluded in step S22 that the checksum is valid, the printing program is considered to have no error, and thus a list is printed in step S23. Then in step S24 an error message is displayed. Finally, in step S25 the process stops in an abnormal state. The abnormal termination at step S25 may be performed by entering an endless loop in which the error message is displayed so that any commands entered by the user via a key operation and incoming calls from an exchange are ignored. Alternatively, the power may be forcibly turned off.

Now a fourth embodiment will be described below.

Figure 10:
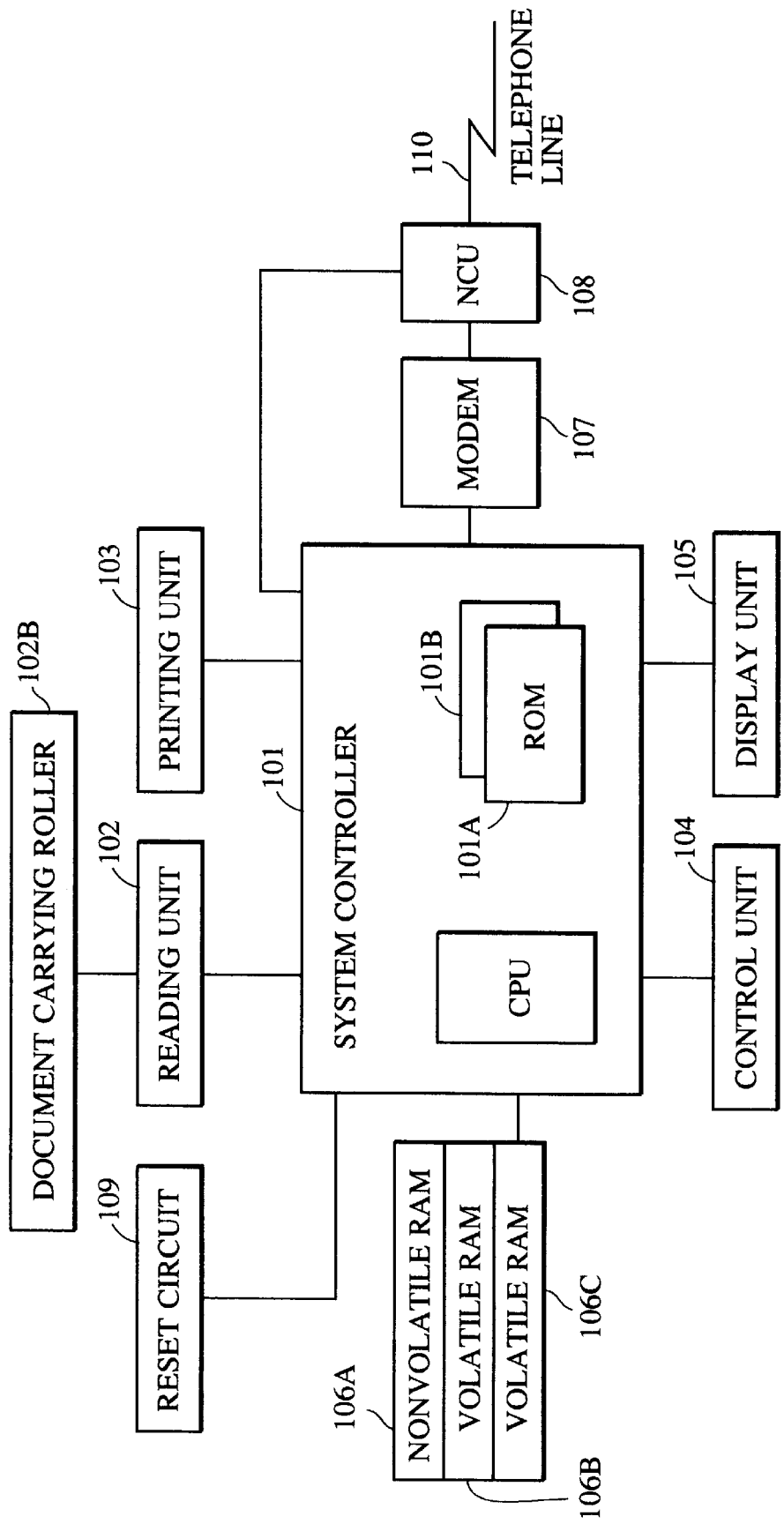
FIG. 10 is a block diagram illustrating the construction of a facsimile device according to a fourth embodiment of the invention.

FIG. 10 is a block diagram illustrating the construction of a facsimile device according to the fourth embodiment of the invention. As shown in FIG. 10, the facsimile device includes a system controller 101 consisting of a CPU, peripheral circuits of the CPU, a ROM 101A for storing a control program used by the CPU, and a ROM 101B for storing the reference checksum value associated with the program stored in the ROM 101A. The ROM 101A also stores a program for calculating the checksum associated with the program stored in the ROM 101A.

A reading unit 102 includes a CCD image sensor which reads a document to be transmitted while the document is carried by a document carrying roller 102B. The reading unit 102 also includes a document sensor (DS) for judging whether there is a document and a document edge sensor (DES) for judging whether the document is at a reading position.

A printing unit 103 prints an image onto printing paper such as thermal transfer printing paper under the control of an image printing controller (not shown).

A control unit 104 includes various operation keys arranged on a panel. The control unit 104 also includes a switch by which a user can select an operation when the checksum is judged invalid and thus an error message is displayed.

A display unit 105 serves as notification means for displaying the status of the facsimile device and an alarm message. The control unit 104 and the display unit 105 need not be separate from each other, but may be realized in a single unit.

A nonvolatile RAM 106A is used to store communication data such as telephone numbers of the sending facsimile device and destination devices as well as the abbreviation of a user. The nonvolatile RAM 106A also stores the checksum of these communication data. The nonvolatile RAM 106A may be replaced by a battery-backed volatile RAM.

A volatile RAM 106B is used to store communication data associated with a receiving operation. A volatile RAM 106C serves as an image memory for storing image data which has been received or read. Instead of a volatile RAM, a hard disk device may also be employed for the same purpose.

A modem (modulation-demodulation unit) 107 modulates a signal to be transmitted and demodulates a received signal. An NCU (network control unit) 108 performs an automatic receiving operation and a relating line control operation upon detection of a ringing signal. The NCU 108 also sends a selection signal (in the form of a pulse or tone dialing signal) over a telephone line 110 under the control of the system controller 101.

A reset circuit 109 serves as a watch dog timer which starts a timer operation when the system clock signal generated by the system controller 101 is stopped. Thus, the reset circuit 109 outputs a reset signal to the system controller 101 when the power is turned on or an error or failure occurs during operation.

Figure 11:
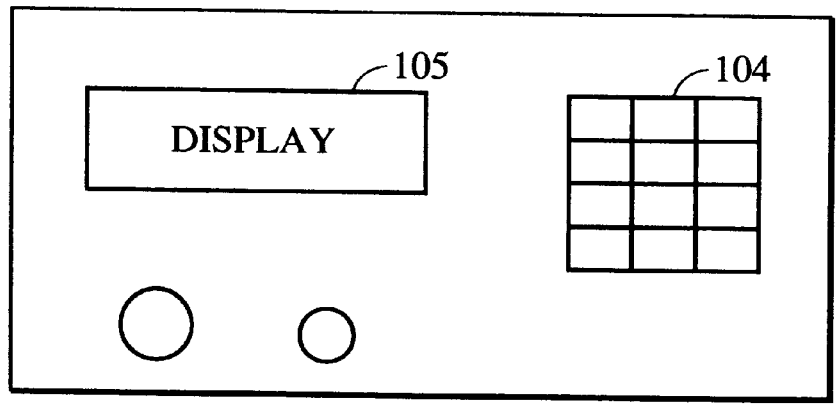
FIG. 11 is a schematic diagram of a control panel of the facsimile device according to the fourth embodiment of the invention.

FIG. 11 illustrates a control panel on which the control unit 104 and the display unit 105 are disposed.

The operation of calculating the checksum of the program area and the operation of informing a user of an error if the checksum is not valid, are described in detail below.

Figure 12:
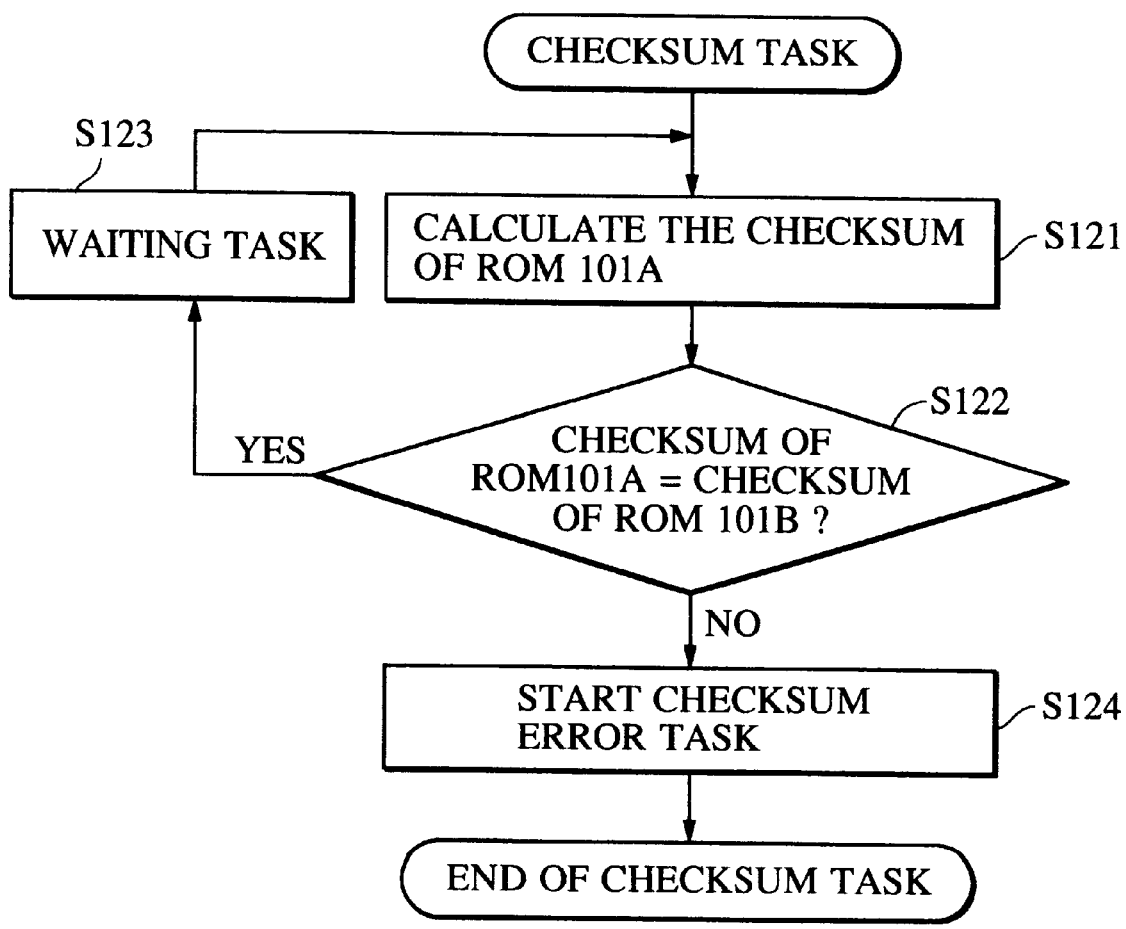
FIG. 12 is a flowchart illustrating a checksum task according to the fourth embodiment of the invention.

FIG. 12 is a flowchart illustrating a checksum task according to the present embodiment. In the first step S121 after the power is turned on, the CPU of the system controller 101 performs a task given the lowest priority in a multitask system according to a control program stored in the ROM 101A, thereby calculating the checksum of the control program stored in the ROM 101A.

The calculation of the checksum is performed in the same manner as in the first to third embodiments, and thus is not described in further detail here.

Then in step S122, the checksum value obtained in step S121 is compared with the reference checksum value stored in the ROM 101B. If the checksum value is valid, the process goes to step S123, in which in response to a system call of the multitask system the checksum task enters a waiting state of a predetermined time period. After the predetermined waiting time has elapsed, the process returns to step S121 so as to perform the above-described calculation of the checksum again. That is, in this embodiment, the checksum is calculated periodically while the facsimile device is in operation.

In step S122, the checksum value obtained in step S121 is compared with the reference checksum value stored in the ROM 101B. If the result is invalid, the process goes to step S124 so as to start a checksum error task for informing a user that a checksum error occurs. Then, the checksum task is completed.

Figure 13:
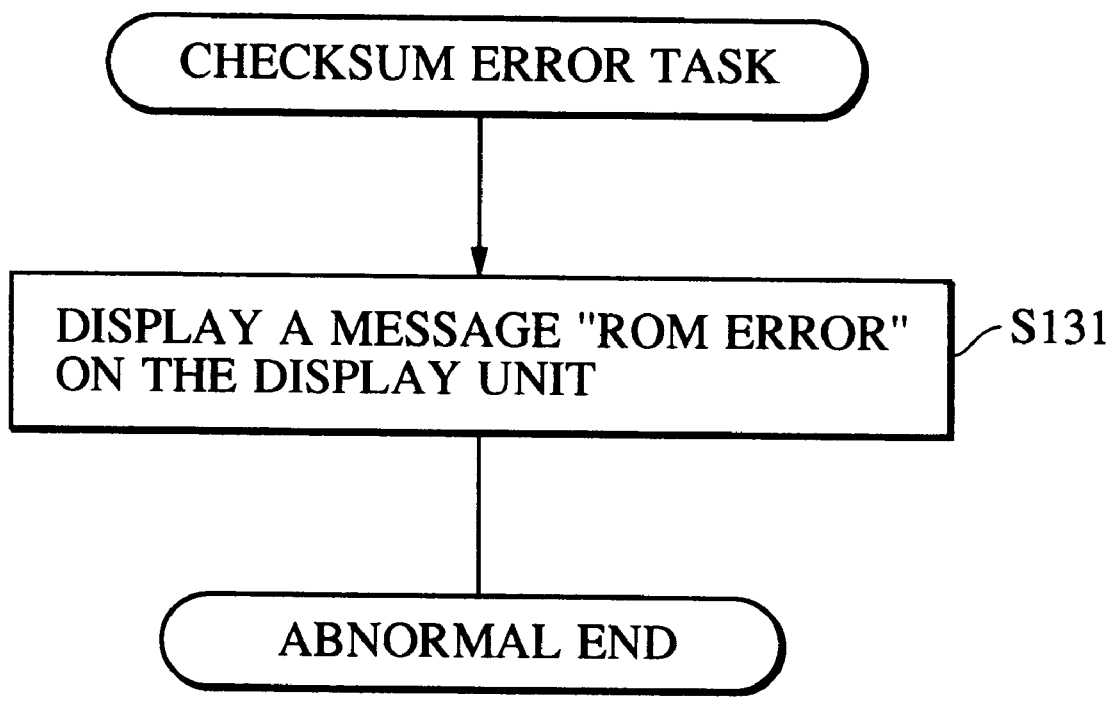
FIG. 13 is a flowchart illustrating a checksum error task according to the fourth embodiment of the invention.

In the present embodiment, the checksum error task for informing a user of a checksum error is given the highest priority of the multitask system, and is executed as shown in the flowchart of FIG. 13. In the first step S131 of the checksum error task, a message saying "ROM ERROR" is displayed on the display unit. After the completion of step S131, the task results in an abnormal termination.

As in the previous embodiments, the abnormal termination may be performed by entering an endless loop so that any commands entered by the user via a key operation and incoming calls from an exchange are ignored. Alternatively, the power may be forcibly turned off.

In the multitask system, when a task having the highest priority is being executed, other tasks cannot be executed. Therefore, if the highest priority is given to the checksum error task, a further abnormal operation never occurs when the checksum error task reveals that the program stored in the ROM 101A has been destroyed.

Now a fifth embodiment will be described below.

In this fifth embodiment, if a checksum error is detected during an operation of the facsimile device and thus the operation has to be stopped, information is provided to a user to tell that the memory of the facsimile device contains image data to be transmitted or image data which has been received.

In this embodiment, the facsimile device has the same configuration as that shown in FIG. 10, although it is required to manage the image data stored in the RAM 106B and RAM 106C. The management of the image data is performed in the same manner as in the second and third embodiments, and therefore is not described here again.

The ROM 101B stores the checksum values for individual functions as well as the checksum value for the entire program.

Figure 14:
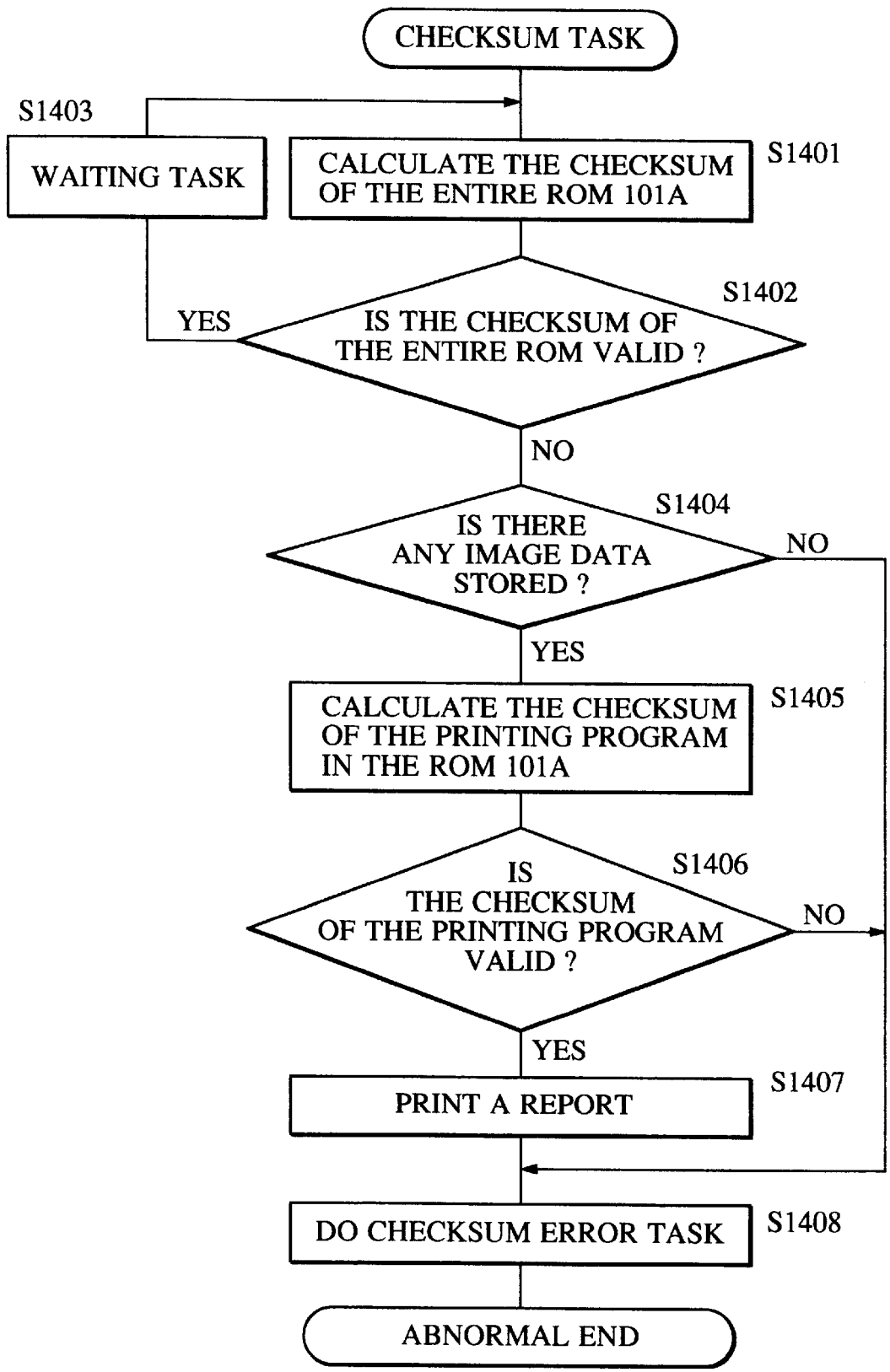
FIG. 14 is

FIG. 14 is a flow chart illustrating a checksum task according to the present embodiment of the invention.

In the first step S1401 after the power is turned on, the CPU of the system controller 101 performs a task given the lowest priority in a multitask system according to a control program stored in the ROM 101A, thereby calculating the checksum of the entire control program stored in the ROM 101A. As in the first to fourth embodiments described above, the checksum value is obtained by calculating the sum of all data read byte by byte.

In step S1402, the resultant checksum value is compared with the reference checksum value associated with the entire program, wherein the reference value is stored in the ROM 101B. If the resultant value is valid, then the process goes to step S1403 in which, in response to a system call of the multitask system, the checksum task enters a waiting state of a predetermined time period.

After the predetermined waiting time has elapsed, the process returns to step S1401 so as to perform the above-described calculation of the checksum again.

If it is concluded in S1402 that the checksum value is invalid, the process goes to step S1404 so as to check whether either the RAM 106B or the RAM 106C contains any image data. If no image data is stored, the process goes to step S1408 so as to start a checksum error task, thereby informing a user that a checksum error occurs. This checksum error task is executed in the same manner as in the fourth embodiment described above with reference to FIG. 13. That is, after displaying a checksum error message on the display unit, the process stops in an abnormal state.

The checksum error task is given the highest priority in the multitask system.

If it is concluded in step S1404 that image data is stored in either the RAM 106B or the RAM 106C, the process goes to step S1405 so as to calculate the checksum of the printing program stored in the ROM 101A. The checksum of the printing program stored in the ROM 101A is calculated on the basis of the starting address of the printing program and the information of the size of that program.

Then in step S1406, the resultant checksum value is compared with the reference checksum value associated with the printing program, wherein the reference checksum value is stored in the ROM 101B. If the result is not valid, it is concluded that an error occurs in the printing program, and thus the process goes to step S1408 to do a checksum error task.

On the other hand, if it is concluded in step S1406 that the checksum is valid, the process goes to step S1407 so as to print a report about the stored image data. After the completion of printing the report, the process goes to step S1408 so as to perform a checksum error task and display an error message. Then the process stops in an abnormal state.

In the above abnormal termination after displaying the error message, the process may enter an endless loop as in the first to fourth embodiments, so that any commands entered by the user via a key operation and incoming calls from an exchange are ignored. Alternatively, again, the power may be forcibly turned off.

In the second, third, and fifth embodiments described above, a report is printed when an error associated with the entire program is detected. Alternatively, the stored image may be directly printed without printing a report.

Furthermore, in the fourth and fifth embodiments, it is assumed that the multitask system is used to deal with the checksum error. However, the present invention is not limited to that arrangement. For example, the interrupt capability of a single task system may also be used for the same purpose. In this case, the checksum of the program stored in the ROM is calculated periodically in an interruption subroutine having the lowest priority. If a checksum error is detected by the interruption subroutine, an interrupt with the highest priority is generated so as to display a checksum error message on the display unit. Then the routine enters an endless loop.

The present invention may be applied to either a system including a plurality of devices or a system including only one device.

Furthermore, the present invention can be employed not only in a facsimile device but also in a wide variety of devices which have a program stored in a storage medium.

The present invention can also be applied to a system or an apparatus which operates according to a program supplied from the outside.

In the first to fifth embodiments described above, it is assumed that a program is stored in a ROM. However, the program may also be stored in other types of storage media such as a floppy disk, hard disk, etc.

In the present invention, as described above, the checksum is evaluated when the power of a system is turned on or during an operation of the system, and if an error or failure due to elimination or destruction of data in the program area is detected, an error message is displayed so that a user immediately knows of the occurrence of the error. Furthermore, in the present invention, when an error or failure due to elimination or destruction of data in the program area is detected in a system, data can be provided to a user if there is data stored in a memory.

What is claimed is:

1. A communication device which operates under the control of a control program, comprising:

first storage means for storing the control program for controlling said communication device, the control program including a communication program which performs communication, and first information used to detect an error in the control program;

a calculation means for performing a predetermined calculating process associated with the control program and comparing second information generated in the predetermined calculating process with the first information in order to detect an error in at least the communication program; and a control means for controlling a predetermined operation in accordance with a result obtained in the comparison.

2. A communication device according to claim 1, wherein said calculation means performs said predetermined calculation process in response to turning on of power to said communication device.

3. A communication device according to claim 1, wherein said calculation means performs said predetermined calculation process at regular intervals.

4. A communication device according to claim 1, wherein said communication device is capable of performing a plurality of tasks including a task of said predetermined calculating process and a task of said predetermined operation in parallel, wherein the task of said predetermined calculating process has an order of priority lower than the task of said predetermined operation.

5. A communication device according to claim 1, wherein said communication device is capable of performance of a plurality of interrupt routines including an interrupt routine of said predetermined calculating process and an interrupt routine of said predetermined operation, and wherein the interrupt routine of said predetermined calculating process has an order of priority lower than the interrupt routine of said predetermined operation.

6. A communication device according to claim 1, wherein said predetermined operation performed under the control of said control means is to indicate occurrence of an error associated with at least the communication program stored in said storage means.

7. A communication device according to claim 1, wherein said predetermined operation performed under the control of said control means is to prohibit operation of said communication device.

8. A communication device according to claim 1, wherein said control means checks whether there is stored communication data, and if so, outputs information associated with such stored communication data.

9. A communication device according to claim 1, wherein said communication device further comprises second storing means for storing communication data, and wherein said control program comprises an output program for outputting the communication data stored in said second storing means;

said first information comprises third information for detecting an error in said output program; and said calculation means detects an error in said output program on the basis of said third information independently of the error-detection by a control program other than said output program.

10. A device according to claim 9, wherein said calculation means performs error-detection on the output program by performing a predetermined calculating process with respect to the output program and comparing fourth information obtained by the predetermined calculating process with the third information.

11. A device according to claim 9, wherein said control means outputs fifth information based on the communication data stored in said second storing means in accordance with error detection performed on the output program.

12. A control method for controlling a communication device which has a memory for storing a control program including a communication program for performing communication and first information used to detect an error in the control program, and which operates under the control of the control program, said method comprising the steps of:

a calculation step for performing a predetermined calculating process associated with the control program and comparing second information generating the predetermined calculating process with the first information in order to detect an error in at least the communication program; and a control step for controlling a predetermined operation in accordance with a result obtained in the comparison.

13. A method according to claim 12, wherein in said calculation step, the predetermined calculation process is performed in response to turning on of power to the communication device.

14. A method according to claim 12, wherein, in said calculation step, the predetermined calculation process is performed at a regular interval.

15. A method according to claim 12, wherein the predetermined operation is to indicate occurrence of an error associated with at least the stored communication program.

16. A method according to claim 12, wherein the communication device is capable of performing a plurality of tasks (including the predetermined calculating process and the predetermined operation) in parallel, and wherein the task of performing the predetermined calculating process has an order of priority lower than the task of performing the predetermined operation.

17. A method according to claim 12, wherein the communication device is capable of performance in a plurality of interrupt routines including an interrupt routine of the predetermined calculating process and an interrupt routine of the predetermined operation, and wherein the interrupt routine of the predetermined calculating process has an order of priority lower than the interrupt routine of the predetermined operation.

18. A method of controlling a communication device, according to claim 12, wherein said predetermined operation is to prohibit the operation of said communication device.

19. A method of controlling a communication device, according to claim 12, wherein said predetermined operation is to check whether there is stored communication data, if so, and to output information associated with such stored communication data.

20. A method according to claim 12, wherein the communication device is capable of storing communication data, and the control program comprises an output program for outputting the communication data stored; and wherein the first information comprises third information for detecting an error in the output program; and wherein, in said calculation step, an error in the output program is detected on the basis of the third information, independently of the error-detection by a control program, other than the output program.

21. A method according to claim 20, wherein, in said calculation step, error-detection on the output program is performed by performing a predetermined calculating process with respect to the output program and by comparing fourth information obtained by the predetermined calculating process with the third information.

22. A method according to claim 20, wherein, in said control step, fifth information is output based on the stored communication data in accordance with the error-detection performed in the output program.

23. A program storage device readable by a machine, tangibly embodying a program of instructions executable by the machine to perform method step for detecting an error in a control program of a communication device which is capable of storing communication data and stores a control program which comprises a communication program for performing communication, for controlling the communication device and first information used to detect an error in the control program and operates under the control of a control program, said program comprising the steps of:

a calculating step for performing a predetermined calculating process associated with the control Program and comparing second information generated on the predetermined calculating process with the first information in order to detect an error in at least the communication program; and a control step for controlling a predetermined operation in accordance with a result obtained in the comparison.

24. A device according to claim 23, wherein, in said calculation step, the predetermined calculation process is performed in response to turning on of power to the communication device.

25. A device according to claim 23, wherein, in said calculation step, the predetermined calculation process is performed at regular intervals.

26. A device according to claim 23, wherein the communication device is capable of performing a plurality of tasks (including the predetermined operation) in parallel, and wherein the task of performing the predetermined calculating process has an order of priority lower than the task of performing the predetermined operation.

27. An article of manufacture, according to claim 23, wherein said predetermined operation is to indicate the occurrence of an error associated with at least the stored communication program.

28. An article of manufacture, according to claim 23, wherein said predetermined operation is to prohibit the operation of the communication device.

29. An article of manufacture, according to claim 23, wherein said predetermined operation comprises the steps of:

checking whether there is stored communication data; and if it is concluded that there is such communication data, further outputting information associated with that communication data.

30. A device according to claim 23, wherein the communication device is capable of storing communication data, and wherein:

the control program comprises an output program for outputting the stored communication data;

the first information comprises third information for detecting an error in the output program; and the calculation detects an error in the output program on the basis of the third information independently of the error-detection by a control program other than the output program.

31. A device according to claim 30, wherein, in said calculation step, error detection on the output program is performed by performing a predetermined calculating process with respect to the output program and by comparing fourth information obtained by the predetermined calculating process with the third information.

32. A device according to claim 30, wherein, in said control step, fifth information based on the stored communication data is output in accordance with error detection performed on the output program.

33. A device according to claim 23, wherein the communication device is capable of performance in a plurality of interrupt routines including an interrupt routine of the predetermined calculating process and an interrupt routine of the predetermined operation, and wherein the interrupt routine of the predetermined calculating process has an order of priority lower than the interrupt routine of the predetermined operation.

34. A communication device which operates under the control of a control program, comprising:

a first storage means for storing a control program which comprises a communication program for performing communication, to control said communication device and first information to detect an error in the control program;

calculation means for performing a predetermined calculating process associated with the control program and comparing second information generated in the predetermined calculating process with the first information, responsive to supply of electric power to said communication device in order to detect an error of at least the communication program; and control means for controller a predetermined operation in accordance with a result of the comparison.

35. A device according to claim 34, wherein said calculation means performs the calculating process at regular intervals after turning on of power.

36. A device according to claim 34, wherein the predetermined operation is to indicate occurrence of an error associated with at least the communication program stored in said first storage means.

37. A device according to claim 34, wherein the predetermined operation is to prohibit operation of said communication device.

38. A device according to claim 34, wherein said communication device comprises a second storage means for storing communication data, the control program comprises an output program for outputting the communication data stored in said second storage means, the first information comprises third information used to detect an error in the output program, and said calculation means detects an error in the output program based on the third information, independently of error detection by a control program other than the output program.

39. A device according to claim 38, wherein said calculation means performs error-detection on the output program by performing a predetermined calculating process with respect to the output program and by comparing fourth information obtained by the predetermined calculating process with the third information.

40. A device according to claim 38, wherein said control means outputs fifth information based on the communication data stored in said second storage means in accordance with error detection performed on the output program.

41. A control method for controlling a communication device which stores a control program which comprises a communication program for performing communication, and first information used to detect an error in the control program, and which operates under the control of the control program, said method comprising the steps of:

a calculation step for performing a predetermined calculating process associated with the control program and comparing second information generated on the predetermined calculating process with the first information when responsive to supply of electric power to the communication device in order to detect an error of at least the communication program; and a control step for controlling a predetermined operation in accordance with a result obtained in the comparison.

42. A method according to claim 41, wherein, in said calculation step, the predetermined calculation is performed at regular intervals after turning on of power.

43. A method according to claim 41, wherein the predetermined operation is to indicate occurrence of an error associated with at least the stored communication program.

44. A method according to claim 41, wherein the predetermined operation is to prohibit operation of the communication device.

45. A method according to claim 41, wherein:

the communication device is capable of storing communication data, the control program comprises an output program for outputting the stored communication data;

the first information comprises third information used to detect an error in the output program; and in said calculation step, an error in the output program is detected on the basis of the third information, independently of the error detection by a control program other than the output program.

46. A method according to claim 45, wherein, in said calculation step, error-detection on the output program is performed by performing a predetermined calculating process with respect to the output program and by comparing fourth information obtained by the predetermined calculating process with the third information.

47. A method according to claim 45, wherein, in said control step, fifth information based on the stored communication data is output in accordance with error detection by the output program.

48. A program storage device readable by a machine, tangibly embodying a program of instructions executable by the machine to perform method steps for detecting an error in a control program of a communication device which is capable of storing communication data and stores a control program which comprises a communication program for performing communication, for controlling the communication device and first information used to detect an error in the control program, and which operates under the control of a control program, said program of instructions comprising:

a calculation step of performing a predetermined calculating process associated with the control program and comparing second information generated on the predetermined calculating process with the first information responsive to supplying of electric power to the communication device in order to detect an error in at least the communication program; and a control step for controlling a predetermined operation in accordance with a result obtained in the comparison.

49. A device according to claim 48, wherein, in said calculation step, the calculation process is performed at regular intervals after turning on of power.

50. A device according to claim 48, wherein the predetermined operation is to indicate occurrence of an error associated with at least the stored communication program.

51. A device according to claim 48, wherein the predetermined operation is to prohibit operation of the communication device.

52. A device according to claim 48, wherein:
the communication device is capable of storing communication data;
the control program comprises an output program for outputting the stored communication data;
the first information comprises third information used to detect an error in the output program; and
in said calculation step, an error in the output program is detected on the basis of the third information, independently of the error-detection by a control program other than said output program.

53. A device according to claim 52, wherein, in said calculation step, error detection on the output program is performed by performing a predetermined calculating process with respect to the output program and by comparing fourth information obtained by the predetermined calculating process with the third information.

54. A device according to claim 52, wherein, in said control step, fifth information based on the stored communication data is output in accordance with error detection performed on the output program.

55. A communication device which operates under the control of a control program, comprising:
a first storage means for storing communication data;
a second storage means for storing the control program which controls said communication device;
an error detection means for detecting an error in the control program;
a determination means for determining whether the data stored in said first storage means exists or not when an error in the control program is detected by said error detection means; and
an output means for outputting first information based on the stored communication data when it is detected that the communication data are stored by said determination means.

56. A device according to claim 55, wherein said error detection means detects an error in the control program in response to turning on of power to said communication device.

57. A device according to claim 55, wherein said error detection means detects an error in the control program at regular intervals.

58. A device according to claim 55, further comprising a warning means which warns of an error in the control program in accordance with detection of the error by said error detection means.

59. A device according to claim 55, wherein said output means prohibits operation of said communication device when outputting of the first information is completed.

60. A device according to claim 55, wherein said error detection means detects also an error in an output control program for controlling output of the first information by said outputting means, and said output means does not output the first information when an error in the output control program is detected.

61. A device according to claim 55, wherein said second storage means stores second information used to detect an error in the control program, and
wherein said error detection means comprises:
calculation means for calculating third information based on the control program for detecting an error in the control program; and
comparing means for comparing the third information obtained by said calculation means with the second information, and
wherein said error detection means detects an error in the control program in accordance with a result of comparison provided by said comparing means.

62. A control method of controlling a communication device which is capable of storing communication data and stores a control program for controlling the communication device and operates under the control of a control program, said method comprising:
an error detection step for detecting an error in the control program;
a determination step for determining whether the stored communication data exists or not, when an error in the control program is detected in said error detection step; and
an output step for outputting first information based on the stored communication data when it is determined that the communication data are stored in said determination step.

63. A method according to claim 62, wherein, in said error detection step, an error in the control program is detected in response to turning on of power to the communication device.

64. A method according to claim 62, wherein, in said error detection step, an error in the control program is detected at regular intervals.

65. A method according to claim 62, further comprising a warning step for warning of an error in the control program in accordance with detection of an error in said error detection step.

66. A method according to claim 62, wherein, in said output step, operation of the communication device is prohibited when outputting of the first information is completed.

67. A method according to claim 62, wherein, in said error detection step, an error in an output control program for controlling output of the first information is also detected, and
wherein, in said output step, the first information is not output when an error in the output control program is detected.

68. A method according to claim 62, wherein the communication device stores second information used to detect an error in the control program, and wherein said error detection step comprises:
a calculation step of calculating third information based on the control program for detecting an error in the control program; and
a comparing step for comparing the third information calculated in said calculation step with the second information, and
wherein, in said error detection step, an error in the control program is detected in accordance with a result of comparison obtained in said comparing step.

69. A program storage device readable by a machine, tangibly embodying a program of instructions executable by the machine to perform method steps for detecting an error in a control program of a communication device which is capable of storing communication data and stores a control program for controlling the communication device and operates under the control of the control program, said program of instructions comprising:

an error detection step for detecting an error in the control program;

a determination step for determining whether the stored communication data exists or not, when an error in the control program is detected in said error detection step; and an output step for outputting first information based on the stored communication data when it is determined that the communication data are stored in said determination step.

70. A device according to claim 69, wherein, in said error detection step, an error in the control program is detected in response to turning on of power to the communication device.

71. A device according to claim 69, wherein, in said error detection step, an error in the control program is detected at regular intervals.

72. A device according to claim 69, wherein said program of instructions further comprises a warning step for warning of an error in the control program in accordance with detection of an error in said error detection step.

73. A device according to claim 69, wherein, in said output step, operation of the communication device is prohibited when outputting of the first information is completed.

74. A device according to claim 69, wherein, in said error detection step, an error in an output control program for controlling output of the first information is also detected, and wherein, in said output step, the first information is not output when an error in the output control program is detected.

75. A device according to claim 69, wherein the communication device stores second information used to detect an error in the control program, and wherein said error detection step comprises:
a calculation step of calculating third information based on the control program for detecting an error in the control program; and
a comparing step for comparing the third information calculated in said calculation step with the second information, and wherein, in said error detection step, an error in the control program is detected in accordance with a result of comparison obtained in said comparing step.

76. A communication device for communicating communication data, which operates under the control of a control program, the communication device comprising:

first storage means for storing the communication data;

second storage means for storing the control program which controls said communication device;

error detection means for detecting an error in the control program; and output means for, when the error in the control program is detected, outputting a report describing the communication data stored in said first storage means.

77. A device according to claim 76, wherein said error detection means detects an error in the control program in response to turning on of power to said communication device.

78. A device according to claim 76, wherein said error detection means detects an error in the control program at regular intervals.

79. A device according to claim 76, further comprising a warning means which warns of an error in the control program in according with detection of the error by said error detection means.

80. A device according to claim 76, wherein said output means prohibits operation of said communication device when outputting of the report is completed.

81. A device according to claim 76, wherein said error detection means detects also an error in an output control program for controlling output of the report by said outputting means, and said output means does not output the report when an error in the output control program is detected.

82. A device according to claim 76, wherein said second storage means stores first information used to detect an error in the control program, and wherein said error detection means comprising:
calculation means for calculating second information based on the control program for detecting an error in the control program; and
comparing means for comparing the second information obtained by said calculation means with the first information, wherein said error detecting means detects an error in the control program in accordance with a result of comparison provided by said comparing means.

83. The device according to claim 76, wherein the communication data comprises image data.

84. The device according to claim 76, wherein the communication data comprises a plurality of data structures, and the report describes each of the data structures.

85. The device according to claim 76, wherein the report comprises a printout of the communication data.

86. A control method of controlling a communication device for communicating communication data, which is capable of storing communication data and stores a control program for controlling the communication device and operates under the control of a control program, said method comprising:

an error detection step for detecting an error in the control program; and an output step for outputting, when the error is detected in said error detection step, a report concerning the stored communication data.

87. A method according to claim 86, wherein, in said error detection step, an error in the control program is detected in response to turning on of power to said communication device.

88. A method according to claim 86, wherein, in said error detection step, an error in the control program is detected at regular intervals.

89. A method according to claim 86, further comprising a warning step for warning of an error in the control program in according with detection of the error in said error detection step.

90. A method according to claim 86, wherein, in said output step, operation of the communication device is prohibited when outputting of the report is completed.

91. A method according to claim 86, wherein, in said error detection step, an error in an output control program for controlling output of the report is also detected, and in said output step, the report is not output when an error in the output control program is detected.

92. A method according to claim 86, wherein, the communication device stores first information used to detect an error in the control program, and wherein said error detection step comprising:
  calculation step for calculating second information based on the control program for detecting an error in the control program; and
  comparing step for comparing the second information calculated in said calculation step with the first information,
  wherein, in said error detection step, an error in the control program is detected in accordance with a result of comparison obtained in said comparing step.

93. The device according to claim 86, wherein the communication data comprises image data.

94. The device according to claim 86, wherein the communication data comprises a plurality of data structures, and the report describes each of the data structures.

95. The device according to claim 86, wherein the report comprises a printout of the communication data.

96. A program storage device readable by a machine, tangibly embodying a program of instructions executable by the machine to perform method step for detecting an error in a control program of a communication device for communicating communication data, which is capable of storing communication data and stores a control program for controlling said communication device and operates under the control of the control program, said program of instructions comprising:
  an error detection step for detecting an error in the control program;
  and an output step for outputting, when the error is detected in said error detection step, a report concerning the stored communication data.

97. A device according to claim 96, wherein, in said error detection step, an error in the control program is detected in response to turning on of power to said communication device.

98. A device according to claim 96, wherein, in said error detection step, an error in the control program is detected at regular intervals.

99. A device according to claim 96, further comprising a warning step for warning of an error in the control program in according with detection of the error in said error detection step.

100. A device according to claim 96, wherein, in said output step, operation of the communication device is prohibited when outputting of the report is completed.

101. A device according to claim 96, wherein, in said error detection step, an error in an output control program for controlling output of the report is also detected, and
  in said output step, the report is not output when an error in the output control program is detected.

102. A device according to claim 96, wherein, the communication device stores first information used to detect an error in the control program,
  wherein said error detection step comprising:
    calculation step for calculating second information based on the control program for detecting an error in the control program; and
    comparing step for comparing the second information calculated in said calculation step with the first information,
    wherein, in said error detection step, an error in the control program is detected in accordance with a result of comparison obtained in said comparing step.

103. The device according to claim 96, wherein the communication data comprises image data.

104. The device according to claim 96, wherein the communication data comprises a plurality of data structures, and the report describes each of the data structures.

105. The device according to claim 96, wherein the report comprises a printout of the communication data.

* * * * *

UNITED STATES PATENT AND TRADEMARK OFFICE
CERTIFICATE OF CORRECTION

PATENT NO. : 5,918,006
DATED : June 29,1999
INVENTOR(S): HITOSHI SAITO ET AL.

It is certified that error appears in the above-identified patent and that said Letters Patent is hereby corrected as shown below:

COLUMN 2

Line 34, "Fig.14 is" (second occurrence) should be deleted.

COLUMN 6

Line 2, "S16." should read --S15.--.

COLUMN 12

Line 30, "Program" should read --program--.

COLUMN 13

Line 42, "controller" should read --controlling--.

COLUMN 18

Line 6, "according" should read --accordance--;
   Line 18, "comprising:" should read --comprises:--; and
   Line 55, ""according" should read --accordance--.

COLUMN 19

Line 1, "comprising:" should read --comprises:--.

UNITED STATES PATENT AND TRADEMARK OFFICE
CERTIFICATE OF CORRECTION

PATENT NO. : 5,918,006

DATED : June 29, 1999

INVENTOR(S) : HITOSHI SAITO ET AL.

It is certified that error appears in the above-identified patent and that said Letters Patent is hereby corrected as shown below:

COLUMN 20

Line 6, "according" should read --accordance--; and
Line 18, "comprising:" should read --comprises:--;

Signed and Sealed this

Fourteenth Day of March, 2000

Attest:

Attesting Officer

Q. TODD DICKINSON

Commissioner of Patents and Trademarks